United States Patent Office 3,770,742
Patented Nov. 6, 1973

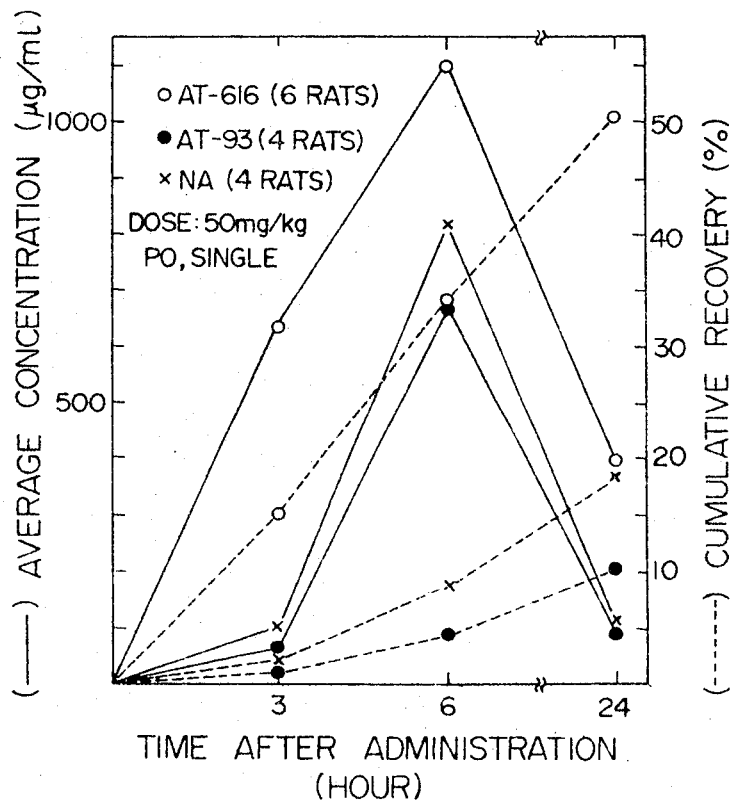

3,770,742
2-(SUBSTITUTED PYRROLIDINO) - 8-LOWER ALKYL - 5,8-DIHYDRO - 5-OXOPYRIDO[2,3-d] PYRIMIDINE-6-CARBOXYLIC ACID DERIVATIVES, AND PROCESS FOR THE PREPARATION OF THE SAME
Jun-Ichi Matsumoto and Yutaka Sekine, Osaka, Yoshiyuki Takase, Amagasaki, and Shinichi Nakamura, Osaka, Japan, assignors to Dainippon Pharmaceutical Co., Ltd., Higashi-ku, Osaka-fu, Japan
Filed Aug. 24, 1971, Ser. No. 174,431
Int. Cl. C07d 51/46
U.S. Cl. 260—256.4 F                8 Claims

ABSTRACT OF THE DISCLOSURE 2-(substituted pyrrolidino)-8-lower alkyl-5,8-dihydro-5-oxopyrido[2,3-d]pyrimidine-6-carboxylic acid derivatives of the formula,

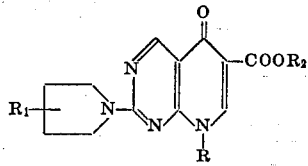

wherein
$R_1$ represents a hydroxyl, formyloxy, lower alkanoyloxy, benzoyloxy, or lower alkylsulfonyloxy group, group,
R represents a lower alkyl group, and
$R_2$ represents a hydrogen atom or a lower alkyl group.

The derivatives exhibit anti-bacterial activity against gram positive and gram negative bacteria An exemplary derivative is 2-(3-hydroxypyrrolidino)-2-ethyl-5,8 - dihydro-5-oxopyrido[2,3-d]pyrimidine-6-carboxylic acid.

---

This invention relates to novel compounds which exhibit antibacterial activity against gram positive and gram negative bacteria.

The novel compounds of this invention are 2-(substituted pyrrolidino)-8-lower alkyl-5,8-dihydro - 5 - oxopyrido[2,3-d]pyrimidine-6 - carboxylic acid derivatives, which can be represented by the formula:

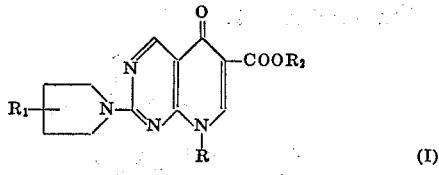

wherein
$R_1$ represents a hydroxyl, formyloxy, lower alkanoyloxy, benzoyloxy, or lower alkylsulfonyloxy group,
R represents a lower alkyl group, and $R_2$ represents a hydrogen atom or a lower alkyl group.

In the above, lower alkyl group means an alkyl group of 1–4 carbon atoms, and lower alkanoyl group means an alkanoyl group of 1–4 carbon atoms.

2-pyrrolidino-8-lower alkyl-5,8-dihydro-5-oxopyrido[2,3-d]pyrimidine-6-carboxylic acid is described in British patent specification No. 1,129,358. Extensive research has been conducted to find pyride[2,3-d]pyrimidine-type compounds which exhibit higher antibacterial activity than the known compound and it now has been discovered that the compounds of Formula I containing the radical $R_1$ show far higher antibacterial activity, compared with the known compound containing no $R_1$ radical. Furthermore the intestinal absorption of the novel compounds is excellent, assisting the compounds to fully exhibit their pharmaceutical effect. Also the compounds show improved solubility in water.

Accordingly, an object of the invention is to provide the compounds of the foregoing Formula I which have improved antibacterial activity and intestinal absorption, and are satisfactory also with respect to low toxicity.

Still other objects and advantages of the invention will become more apparent from the following description.

According to the subject process, the object compounds of Formula I can be obtained by reacting substituted pyrrolidines of the formula,

in which $R_1$ represents a hydroxyl, formyloxy, lower alkanoyloxy, benzoyloxy, or lower alkylsulfonyloxy group, with 2-substituted-8-alkyl-5,8-dihydro-5-oxopyride[2,3-d] pyrimidine-6-carboxylic acid derivatives of the formula,

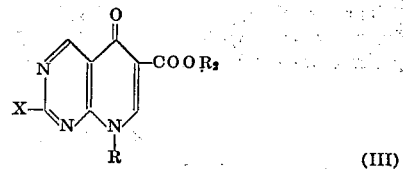

wherein X represents a halogen atom or lower alkylthio group having 1–4 carbon atoms, R represents a lower alkyl group, and $R_2$ represents a hydrogen atom or a lower alkyl group.

Furthermore, when compounds (I) contain hydroxyl group as $R_1$, they can be converted to the compounds (I) containing other $R_1$ groups by esterifying them with acids or reactive derivatives thereof.

The subject process will be explained hereinbelow, as to each different combination of reactants.

One embodiment of the process is to react 2-alkylthio-8 - alkyl-5,8-dihydro-5-oxopyrido[2,3-d]pyrimidine-6-carboxylic acid derivatives of the general formula,

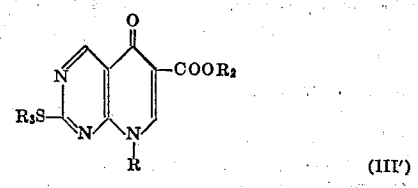

wherein $R_3$ represents a lower alkyl group, and R and $R_2$ are as defined above,
with the substituted pyrrolidines of Formula II.

This embodiment can be practiced by reacting compounds (II) and (III') for a few hours, either dissolved or suspended in suitable inert solvent, under atmospheric pressure and at room temperature or heating conditions. If necessary, the reaction may be effected under elevated pressure. For example, temperatures ranging from room temperature to 160° C., and pressures ranging from normal to 20 kg./cm.² G, may be employed.

The solvent is suitably selected according to the solubility of particular reactants, among, for example, lower alcohols such as ethanol and propanol, aromatic hydrocarbons such as benzene and toluene, halogenoalkanes such as dichloroethane and chloroform, ethers such as tetrahydrofuran, dioxane, and diphenylether, acetonitrile, dimethylsulfoxide, dimethylformamide, etc.

Another embodiment for making compounds (I) is to react 2-halogeno-8-alkly-5,8-dihydro-5-oxopyrido[2,3-d]pyrimidine-6-carboxylic acid derivatives of the formula,

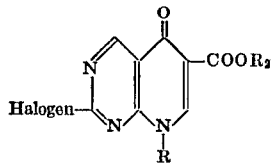

(III'')

wherein R and R₂ are as defined above, with the substituted pyrrolidines of Formula II.

According to this embodiment, the object compounds can be obtained substantially quantitatively, by heating together compounds (II) and (III'') in a solvent, under atmospheric pressure. The reaction temperature should preferably range from 60°–160° C.

As the solvent, those named with respect to the first embodiment may be utilized with equally satisfactory results.

The compound (I) containing a hydroxyl group as $R_1$, which are obtained by this embodiment, can be converted to the compounds represented by later given Formula VI which contain as $R_1$ groups other than a hydroxyl group, if desired, by esterifying them with suitable acids or reactive derivatives thereof.

That is, through the esterification reaction of 2-(hydroxypyrrolidino)-8-alkyl-5,8-dihydro-5-oxopyrido[2,3-d]pyrimidine-6-carboxylic acid derivatives of the formula,

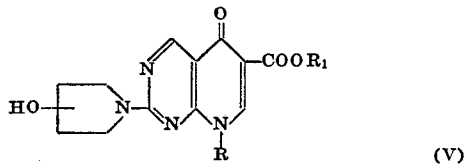

(V)

wherein R and R₂ are as defined above, with acids or reactive derivatives thereof, 2-(substituted pyrrolidino)-8-alkyl - 5,8 - dihydro-5-oxopyrido[2,3-d]pyrimidine-6-carboxylic acid derivatives of the formula,

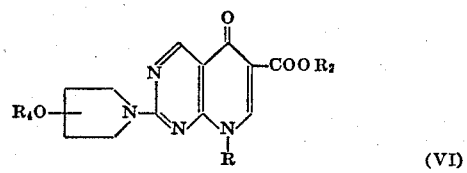

(VI)

wherein R₄ represents a lower alkanoyl, lower alkylsulfonyl, formyl or benzoyl group, and R and R₂ are as defined above, can be obtained.

According to this embodiment, the object compounds (VI) can be obtained by reacting the compounds (V) in the optional presence of a solvent, and if necessary, an esterification promotor, with acids or reactive derivatives thereof, following a conventional method. The reaction satisfactorily progresses at room temperature, but if necessary, the system may be cooled, given an elevated temperature, or heated.

Convenient examples of the acids and reactive derivatives thereof useful for the esterification of compounds (V) include organic free acids such as benzoic, acetic, formic, and methanesulfonic acids; halides of such organic acids such as acetyl chloride, benzoyl chloride and methanesulfonyl chloride, and anhydrides of such organic acids, such as acetic anhydride and benzoic anhydride.

If the esterification is performed with an acid halide a tertiary organic base such as pyridine, dimethylaniline or triethylamine, can be used as the esterification promotor. Likewise, if an acid anhydride is used as the esterifying agent, pyridine, p-toluenesulfonic acid, boron trifluoride, etc. may be used as the promotor, while dicyclohexylcarbodiimide, etc. are useful when other acids are used as the esterifying agent. Such acids or reactive derivatives thereof, and esterification promotors are suitably used at an equivalent or somewhat excessive quantity based on compound (V). The type of reaction solvent is suitably selected according to the nature of the acid or reactive derivative thereof, and the esterification promotor, to be employed. For example, if either one or both of the acid or a reactive derivative thereof, and the esterification promotor, is liquid under normal conditions, a solvent is not necessarily used, but otherwise benzene, ether, dioxane, pyridine, etc. is suitably used as the solvent.

The pharmaceutical effect and other activities of typical compounds of this invention will be compared with those of the analogous compounds disclosed in the aforesaid British patent, and of the commercialized compounds. The results are collectively given in later-appearing Tables I through V. The abbreviations given in such tables are as follows:

Compound AT–616:

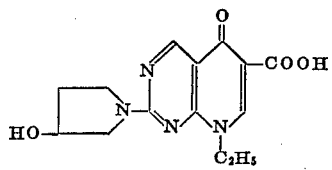

2-(3-hydroxypyrrolidino)-8-ethyl-5,8-dihydro-5-oxopyrido[2,3-d]pyrimidine-6-carboxylic acid (Example 1)

Compound AT–673:

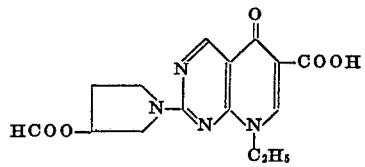

2-(3-formyloxypyrrolidino)-8-ethyl-5,8-dihydro-5-oxopyrido[2,3-d]pyrimidine-6-carboxylic acid (Example 4)

Compound AT–93 (Piromidic acid):

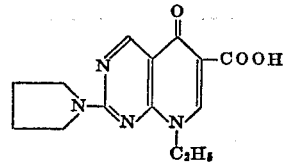

2-pyrrolidino-8-ethyl5,8dihydro-5-oxopyrido[2,3-d]pyrimidine-6-carboxylic acid (British Pat. No. 1,129,358)

Compound AT–89:

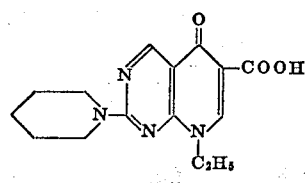

2-piperidino-8-ethyl-5,8-dihydro-5-oxopyrido[2,3-d]pyrimidine-6-carboxylic acid (British Pat. No. 1,129,358)

Compound N.A. (Nalidixic acid):

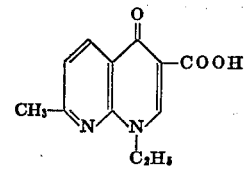

7-methyl-4-oxo-1-ethyl-1,8-naphthyridine-3-carboxylic acid (Belgian Pat. No. 612,258)

The following Table I summarizes the in vitro antibacterial activities of the compounds against a variety of typical microorganisms. The minimum inhibitory concentration (MIC) was determined by the well known serial dilution method.

TABLE I
In vitro antibacterial activity

| Organism | MIC, mcg./ml. | | | |
|---|---|---|---|---|
| | AT-616 | AT-673 | AT-93 | AT-89 |
| Escherichia coli | 1 | 0.3 | 1 | 10 |
| Shigella flexneri 2a | 3 | 3 | 10 | 30 |
| Salmonella typhimurium | 1 | 3 | 3 | 10 |
| Pseudomonas aeruginosa | 100 | 30 | >100 | >100 |

The Table II summarizes in vivo activities of the compound against infection with Salmonella typhimurium in mice.

TABLE II

| Compound | Route | Survived/tested Dose (mg./kg.) | | | | | | $ED_{50}$ (mg./kg.) |
|---|---|---|---|---|---|---|---|---|
| | | 200 | 100 | 50 | 25 | 12.5 | 6.3 | |
| AT-616 | I.p. | | | 10/10 | 3/10 | 8/10 | 5/10 3/10 | ≒12.5 |
| | P.o. | | | 10/10 | 8/10 | 2/10 | 0/10 | 17.7 |
| AT-673 | I.p. | | | | 8/10 | 7/10 | 5/10 | ≒15.4 |
| | P.o. | | | | 9/10 | 3/10 | 3/10 | ≒25.0 |
| AT-93 | I.p. | 10/10 | 9/10 | 5/10 | 3/10 | 0/10 | | 43.5 |
| | P.o. | | 10/10 | 4/10 | 2/10 | 0/10 | | 46.7 |

Note.—Survival rate of non-treated control was 0/10. Treatment: twice a day for 4 days starting on the day of infection (I.p.). The observation was made during two weeks after the infection. Route of infection: I.p. Route of administration: I.p. and p.o.

TABLE III
Efficacy against Staphylococcus aureus No. 10 infection in mice

| Compound | Route | Survived/tested Dose (mg./kg.) | | | | $ED_{50}$ (mg./kg.) |
|---|---|---|---|---|---|---|
| | | 2,000 | 1,000 | 400 | 200 | |
| AT-616 | I.p. | | | 6/10 | 3/10 | ≒400 |
| | P.o. | | | 6/10 | 1/10 | ≒1,000 |
| AT-673 | I.p. | | 9/10 | 9/10 | 2/10 | ≒300 |
| AT-93 | I.p. | 0/10 | 0/10 | | | >2,000 |
| | P.o. | 1/10 | 1/10 | | | >2,000 |
| N.A. | I.p. | | *0/10 | *0/10 | 1/10 | >250 |
| | P.o. | 0/10 | 0/10 | 1/10 | | >2,000 |

*Toxicity.

Note.—Treatment: The predetermined dose was administered immediately after infection and 6 hours thereafter. The test mice were observed on 7th day after the administration. Route of infection: I.p. Route of administration: I.p. and p.o.

TABLE IV
Oral effect on the ascending kidney infection with Escherichia coli in rabbits

| Compound | Dose (mg./ kg./day) | Bacterial finding in kidney [1] | Inhibition of infection, percent |
|---|---|---|---|
| AT-616 | 6.25 | 0/4 | 100 |
| | 3.13 | 0/6 | 100 |
| | 1.56 | 0/2 | 100 |
| | 0.78 | 3/3 | 0 |
| AT-93 | 6.25 | 0/3 | 100 |
| | 3.13 | 0/5 | 100 |
| | 1.56 | 2/3 | 33 |
| | 12.5 | 0/3 | 100 |
| N.A. | 6.25 | 3/4 | 25 |
| | 3.13 | 2/2 | 0 |
| Untreated control | | 8/8 | 0 |

[1] Number of rabbits with bacterium-infected kidney/number of rabbits tested.

TABLE V
Acute toxicity in mice

| Compound | Dose | Survived/tested | |
|---|---|---|---|
| | | I.p. | P.o. |
| AT-616 | 1 g./kg. | 5/5 | 5/5 |
| AT-93 | 1 g./kg. | 4/5 | 5/5 |
| N.A. | 1 g./kg. | 0/5 | 5/5 |

The difference between the subject compounds of this invention and the control compounds as to their concentration in urinary excretion after oral administration will be demonstrated in the attached drawing. From the graph it can be understood that the compounds of this invention show excellent intestine absorption. They can be absorbed at very high concentrations suited to exhibit high antibacterial activity in body.

A clinical dosage of the compound (1) depends on body weight, age and administration mode, but it is generally in the range of 100 mg.–3 g./day, preferably of 300 mg.–2 g./day.

The compounds (1) may be used as medicaments, for example, in the form of pharmaceutical preparations containing the compound in admixture with an organic or inorganic, solid or liquid pharmaceutical adjuvant suitable for enteral, parenteral or local administration. Suitable adjuvant are substances that do not react with the compounds, for example, water, gelatine, lactose, starch, magnesium stearate, talc, vegetable oils, benzyl alcohols, gums, propylene glycol, polyalkylene glycols, and other known medicinal adjuvant. The pharmaceutical preparations may be, for example, tablets, dragées, ointments, creams or capsules, or in liquid form as solutions, suspensions or emulsions. They may be sterilized and/or contain assistants such as preserving, stabilizing, wetting or emulsifying agents, salts for regulating the osmotic pressure or buffers. They may further contain other therapeutically valuable substances. The preparations are prepared by conventional methods.

The pharmaceutical compositions of this invention are valuable not only as antibacterial agents against microorganisms infections to men, but also as the medicines for domestic animals and fowls.

Hereinafter several embodiments of this invention will be explained, with reference to the working examples.

EXAMPLE 1

Preparation of 2-(3-hydroxypyrrolidino)-8-ethyl-5,8-dihydro-5-oxopyrido[2,3-d]pyrimidine-6-carboxylic acid

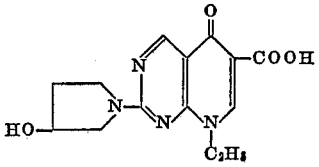

(a) 2.6 grams of 2-methylthio-8-ethyl-5,8-dihydro-5-oxopyrido[2,3-d]pyrimidine-6-carboxylic acid were added to 40 ml. of dimethylformamide, and then 1.5 g. of 3-hydroxypyrrolidine was added. After 3.5 hours reaction at 110° C. under heating, the system was cooled, and the resulting crystalline precipitate was filtered and washed with ethanol. Thus 2.10 g. of crystals were obtained. Separately, the mother liquor was concentrated, and the resulting crystalline solid which weighed 0.78 g. was washed with ethanol.

The crystalline products were combined and recrystallized from a dimethylformamide-ethanol mixture. Thus 2.74 g. of colorless, fine needle-like crystals of the object compound were obtained: M.P., 281–282° C. (decomposition).

(b) 1.27 grams of 2-chloro-8-ethyl-5,8-dihydro-5-oxopyrido[2,4-d]pyrimidine-6-carboxylic acid was added to 20 ml. of dimethylformamide, and then 0.735 g. of 3-hydroxypyrrolidine was added. After 4 hours reaction at 110° C. under heating, dimethylformamide was distilled off from the system under reduced pressure. Adding water to the residue, the crystalline precipitate formed was filtered, and washed with ethanol. Recrystallizing the product from dimethylformamide, yielded 1.34 g. of the object compound as colorless, needle-like crystals.

EXAMPLE 2

Preparation of 2-(3-acetyloxypyrrolidino)-8-ethyl-5,8-dihydro-5-oxopyrido[2,3-d]pyrimidine-6-carboxylic acid

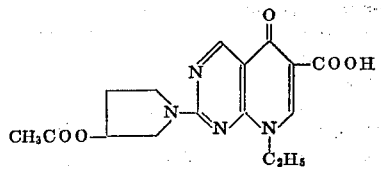

(a) 2.6 grams of 2-methylthio-8-ethyl-5,8-dihydro-5-oxopyrido[2,3-d]pyrimidine-6-carboxylic acid and 1.48 g. of 3-acetyloxypyrrolidine were mixed with 60 ml. of ethanol, and reacted in a sealed tube at 125° C. for 8 hours. Thereafter the system was cooled, and the precipitated crystal were filtered and washed with ethanol. Recrystallizing the product from dimethylformamide-ethanol mixture, yielded 3.02 g. of the object compound as colorless, fine needle-like crystals were: M.P. 230–232° C.

(b) 1.48 grams of 2-chloro-8-ethyl-5,8-dihydro-5-oxopyrido[2,3-d]pyrimidine-6-carboxylic acid was added to 40 ml. of dimethylformamide, and then 1.48 g. of 3-acetyloxypyrrolidine was added. After 4 hours reaction at 110° C., the dimethylformamide was distilled off from the system under reduced pressure. Adding water to the residue, the precipitated crystals were filtered, and washed with ethanol. Recrystallizing the product from dimethylformamide, yielded 2.9 g. of the object compound as colorless, fine needle-like crystals.

(c) A mixture composed of 1.0 g. of 2-(3-hydroxypyrrolidino)-8-ethyl-5,8-dihydro-5-oxopyrido[2,3-d]pyrimidine-6-carboxylic acid, 2 ml. of acetic anhydride and 2 ml. of anhydrous pyridine, was stirred for 4 hours at room temperature. Excessive acetic anhydride and pyridine were then distilled off under reduced pressure, and the residue was recrystallized from dimethylformamide. As a result 0.73 g. of the object compound as colorless, fine needle-like crystals was obtained.

EXAMPLE 3

Preparation of 2-(3-benzoyloxypyrrolidino)-8-ethyl-5,8-dihydro-5-oxopyrido[2,3-d]pyrimidine-6-carboxylic acid

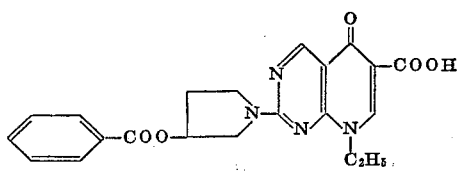

(a) Upon reacting and treating 2.6 g. of 2-methylthio-8-ethyl-5,8-dihyro-5-oxopyrido[2,3-d]pyrimidine-6-carboxylic acid and 2.2 g. of 3-benzoyloxypyrrolidine in the manner similar to Example 1(a), 3.5 g. of the object compound as colorless, fine flaky crystals were obtained: M.P. 238–241° C.

(b) 2.54 grams of 2-chloro-8-ethyl-5,8-dihydro-5-oxopyrido[2,3-d]pyrimidine-6-carboxylic acid were added to 40 ml. of dimethylformamide, and then 2.2 g. of 3-benzolyloxypyrrolidine were added, to be subsequently reacted at 120° C. for 4 hours under heating. Thereafter the system was treated similarly to that of Example (b), to yield 3.4 g. of the object product as colorless, flaky crystals.

(c) 0.6 gram of benzoic anhyride was added to 1.0 g. of 2-(3-hydroxypyrrolidino)-8-ethyl-5,8-dihydro-5-oxopyrido[2,3-d]pyrimidine-6-carboxylic acid, and together refluxed for 2 hours. The system was then cooled, and the precipitate was recovered by filtration and washed with ether. Recrystallizing the resulting crystals from ethyl alcohol yielded, 0.67 g. of the object compound as colorless, fine flaky crystals.

EXAMPLE 4

Preparation of 2-(3-formyloxypyrrolidino)-8-ethyl-5,8-dihydro-5-oxopyrido[2,3-d]pyrimidine-6-carboxylic acid

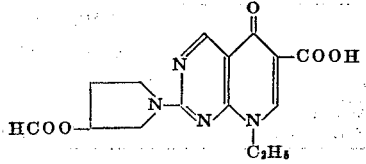

(a) Upon reacting and treating 2.6 g. of 2-methylthio-8-ethyl-5,8-dihydro-5-oxopyrido[2,3-d]pyrimidine-6-carboxylic acid and 1.3 g. of 3-formyloxy-pyrolidine similarly to Example 1(a), 2.9 g. of the object compound as colorless, fine needlelike crystals were obtained: M.P. 231–232° C.

(b) 2-chloro-8-ethyl - 5,8 - dihydro-5-oxopyrido[2,3-d]pyrimidine-6-carboxylic acid (2.54 g.) and 3-formyloxypyrrolidine (1.3 g.) were used as the starting materials in the process described in Example 1(b). Thus 3.15 g. of the object compound as colorless, fine needle-like crystals were obtained.

(c) To 1.0 g. of 2-(3-hydroxypyrrolidino)-8-ethyl-5,8-dihydro-5-oxopyrido[2,3-d]pyrimidine-6-carboxylic acid, 5.0 ml. of formic acid were added, and heated for 30 minutes on a boiling water bath. Then 20 ml. of water were added to the reaction liquid, and precipitated crystals were separated by filtration of the cooled system. Recrystallizing the precipitate from ethanol yielded 0.75 g. of the object compound as colorless, fine needle-like crystals.

EXAMPLE 5

Preparation of 2-(3-methanesulfonyloxypyrrolidino)-8-ethyl-5,8-dihydro - 5 - oxopyrido[2,3-d]pyrimidine-6-carboxylic acid

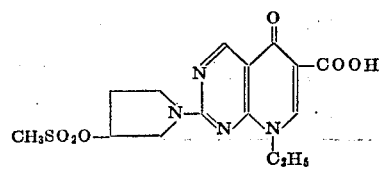

(a) Upon reacting and treating 2.6 g. of 2-methylthio-8-ethyl - 5,8 - dihydro-5-oxopyrido[2,3-d]pyrimidine-6-carboxylic acid and 1.4 g. of 3-methanesulfonyloxypyrrolidine similarly to Example 1(a), 1.6 g. of the object compound as light yellow, prismatic crystals were obtained: M.P. 207–209° C.

(b) 2 - chloro-8-ethyl-5,8-dihydro-5-oxopyrido[2,3-d]pyrimidine-6-carboxylic acid (2.54 g.) and 3-methanesulfonyloxypyrrolidine (1.4 g.) were used as the starting materials in the process described in Example 1(b). Thus 2.9 g. of the object compound as light yellow, prismatic crystals were obtained.

(c) To 1.0 g. of 2-(3-hydroxypyrrolidino)-8-ethyl-5,8-dihydro-5-oxopyrido[2,3-d]pyrimidine - 6 - carboxylic acid, 3 ml. of methanesulfonyl chloride were added and refluxed for 2 hours. Then the reagent was distilled off from the system under reduced pressure, and the residue was recrystallized from a large quantity of acetone. As a result 0.54 g. of the object compound as light yellow, prismatic crystals was obtained.

EXAMPLE 6

| | G. |
|---|---|
| 2-(3-hydroxypyrrolidino)-8-ethyl - 5,8 - dihydro-5-oxopyrido[2,3-d]pyrimidine-6-carboxylic acid | 250 |
| Starch | 54 |
| Microcrystaline cellulose | 90 |
| Talc | 6 |

EXAMPLE 7

| | G. |
|---|---|
| 2-(3-hydroxypyrrolidino)-8-ethyl - 5,8 - dihydro-5-oxopyrido[2,3-d]pyrimidine-6-carboxylic acid | 250 |
| Starch | 60 |
| Lactose | 40 |

The above components were blended and granulated, and filled into 1,000 capsules in accordance with the conventional practice.

What we claim is:

1. A 2-(substituted pyrrolidino)-8-lower alkyl-5,8-dihydro-5-oxopyrido[2,3-d]pyrimidine - 6 - carboxylic acid derivative of the formula,

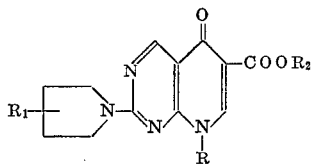

wherein
$R_1$ represents a hydroxyl, formyloxy, lower alkanoyloxy, benzyloxy, or lower alkylsulfonyloxy,
R represents lower alkyl, and
$R_2$ represents hydrogen or lower alkyl.

2. A 2-(substituted pyrrolidino)-8-lower alkyl-5,8-dihydro-5-oxopyrido[2,3-d]pyrimidine - 6 - carboxylic acid derivatives of the formula,

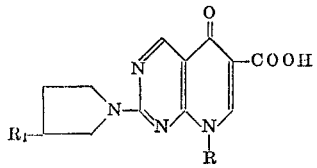

wherein R and $R_1$ are as defined in claim 1.

3. The compound of claim 2, wherein $R_1$ is hydroxyl and R is lower alkyl.

4. 2-(3-hydroxypyrrolidino) - 8 - ethyl-5,8-dihydro-5-oxopyrido[2,3-d]pyrimidine-6-carboxylic acid.

5. 2-(3-formyloxypyrrolidino) - 8 - ethyl-5,8-dihydro-5-oxopyrido[2,3-d]pyrimidine-6-carboxylic acid.

6. 2-(3-acetyloxypyrrolidino) - 8 - ethyl-5,8-dihydro-5-oxopyrido[2,3-d]pyrimidine-6-carboxylic acid.

7. 2-(3-benzoyloxypyrrolidino) - 8 - ethyl-5,8-dihydro-5-oxopyrido[2,3-d]pyrimidine-6-carboxylic acid.

8. 2-(3-methanesulfonyloxypyrrolidino) - 8 - ethyl-5,8-dihydro-5-oxopyrido[2,3-d]pyrimidine-6-carboxylic acid.

References Cited
UNITED STATES PATENTS 3,673,184  6/1972  Minami et al. ____ 260—247.2 R ALEX MAZEL, Primary Examiner R. V. RUSH, Assistant Examiner U.S. Cl. X.R.

260—256.5 R; 424—251

UNITED STATES PATENT OFFICE
CERTIFICATE OF CORRECTION

Patent No. 3,770,742          Dated November 6, 1973

Inventor(s)   Jun-ichi MATSUMOTO ET AL

It is certified that error appears in the above-identified patent and that said Letters Patent are hereby corrected as shown below:

IN THE HEADING:

Insert patentees' claim for priority as follows:

-- Claims priority, application Japan, August 29, 1970,

No. 75812/70 --

Signed and sealed this 2nd day of July 1974.

(SEAL)
Attest:

EDWARD M. FLETCHER, JR.          C. MARSHALL DANN
Attesting Officer                Commissioner of Patents